A. H. REED.
HARROW.
APPLICATION FILED APR. 11, 1917.
1,268,150.
Patented June 4, 1918.
2 SHEETS—SHEET 2.
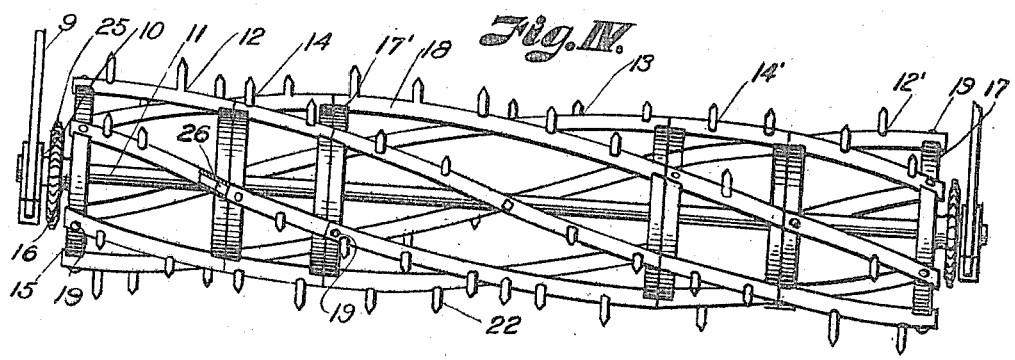
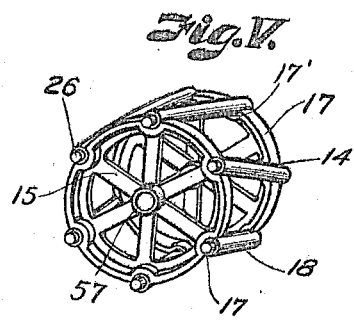
INVENTOR
Andrew H. Reed.
BY
Arthur C. Brown
ATTORNEY

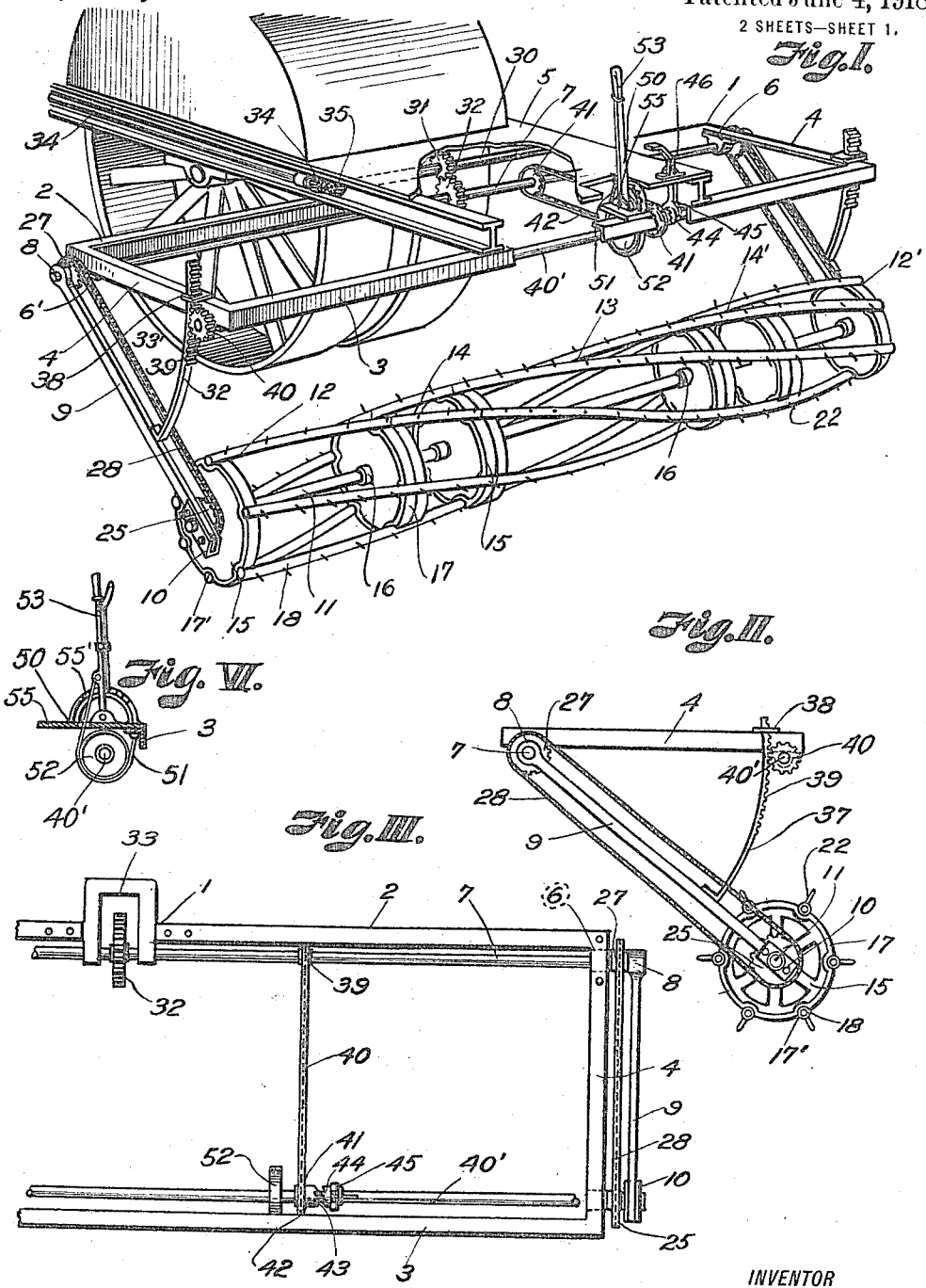

UNITED STATES PATENT OFFICE.

ANDREW H. REED, OF KANSAS CITY, MISSOURI.

HARROW.

1,268,150.　　Specification of Letters Patent.　　Patented June 4, 1918.

Application filed April 11, 1917. Serial No. 161,154.

*To all whom it may concern:*

Be it known that I, ANDREW H. REED, a citizen of the United States, residing at Kansas City, in the county of Jackson and State of Missouri, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to ground working implements and more particularly to a device for pulverizing or harrowing a ground surface, the principal object of the invention being to provide a power driven implement and a frame for mounting the same and its operating mechanism so that it may be conveniently driven from a suitable motor vehicle, such as a farm tractor.

It is also an object of the invention to so construct the carrying parts that ground working implements of various kinds may be used interchangeably thereon and in such position that a ground strip of maximum width may be worked.

In accomplishing these objects, I have provided improved details of structure, the preferred forms of which are illustrated in the accompanying drawings, wherein:

Figure I is a perspective view of a ground working implement constructed according to the present invention mounted on a tractor frame.

Fig. II is an end view of the same.

Fig. III is a partial plan view of the implement showing the driving connection of the rotatable implement.

Fig. IV is a longitudinal elevation of the rotary ground harrow.

Fig. V is a perspective view of one of the intermediate harrow sections.

Fig. VI is a sectional view illustrating the hoist drum and brake.

Referring more in details to the drawings:

1 designates a rectangular frame, preferably of angle iron construction, comprising front and back longitudinal rails 2—3 and end connecting rails 4 and which may be mounted on a suitable carrier, here indicated as a tractor frame 5; the frame 1 being of such length that it extends laterally from the tractor frame 5 to permit working of a ground strip beneath and at both sides of the propelling or carrying vehicle.

Rotatably mounted in bearings 6 suspended from the beams 4 at opposite ends of the front frame 1 and preferably adjacent the front beams 2, is a shaft 7, the ends of which extend slightly beyond the ends of the frame 1 and are revolubly mounted within the end bearings 8 of hanger arms 9; the lower or free ends of which carry bearings 10 wherein a suspended shaft 11 is mounted.

The shaft 11 extends transversely beneath the frame 1 and is adapted to revolubly carry the ground working implements that may be mounted thereon; the principal implement being that illustrated particularly in Figs. I and IV, and comprising interlocking harrow sections; the construction of all the sections being practically the same except as will later be described.

The harrow in its preferred construction comprises opposite end sections 12—12', a central section 13 and intermediate sections 14—14', all of which are locked together when in functional position and are revoluble on the shaft 11, forming an integral and continuous harrowing device.

The end sections 12—12' and central sections 13 each comprise spaced end wheels 15 provided with central bearings 16, whereby they are revolubly mounted in the shaft 11 and are provided with laterally turned peripheral flanges 17 having regularly spaced seats 17' for receiving tube sections 18, which are secured therein by bolts 19 extended through the said tubes and disk flanges. The tube sections 18 are so arranged on the carrying disks that, when all the sections are assembled on the shaft 12, continuous tubes will be formed that extend the length of the device and in spiral relation to the shaft 11.

Each tube section is provided with projecting teeth 22 which are spaced along the tubes and may be of a desired length and inclined to suit their particular use and the teeth of adjacent tubes placed in staggered relation to provide the greatest efficiency possible.

The end sections 12 are provided at their outer ends with driving sprocket wheels 25 and are adapted to interlock at inner ends with the intermediate sections 14—14' which, in turn, lock into the opposite ends of the central section 13, and I prefer to make the central section of such length that it may operate between standing rows of grain and the end sections are spaced from the central sections to leave an opening therebetween when the intermediate sections are removed, for the mounting of cultivating implements, stock cutters, disks, or the like, and each of the end sections is preferably of about half the length of the central section, so that when arranged in this manner the soil between adjacent rows at the sides of the apparatus will be worked for a half of the width of the row spacing adjacent the inner rows. In this way, when working a field, the implement may be driven through alternate rows in order to completely work the field, as when it is driven between the first and second rows it will work all of the soil between such rows and one-half of the space at the outside of said rows, and when driven between the third and fourth rows it will completely work the space between these rows and the remaining spaces between the second and third rows, and a part of the space between the third and fourth.

The preferred means for locking adjacent sections together so that all may be driven from the end sections 12—12' consists in providing each of the tube sections 18 at one end, with an extended plug 26 (Fig. V), which is adapted to project within the open end of an abutting tube when the parts are brought together on the shaft 11, and all of the parts are held on the shaft in locked relation by securing the ends of the shaft in the end bearings 10 of the arms 9.

In order to secure the utmost benefit from the harrow, I rotate the sections during their forward travel, the mechanism for effecting the rotation comprises sprocket wheels 27 mounted at opposite ends of the shaft 7 in paired alinement with the sprocket wheels 25 on the harrow section 12, and running over said paired sprocket wheels are chain belts 28 whereon the harrow sections are rotated by rotation of the shaft 7 to effect the proper treatment of the soil, the harrow sections being yieldingly urged into the soil by their own gravity, because of the free pivotal mounting of the supporting arms on the shaft 7.

The shaft 7 is operatively connected with a driven shaft 30 through gear wheels 31 and 32 that are fixed on the said shaft, the latter operated in a U-shaped bearing 33 that is inserted in the front frame rail 2; and the shaft 30 is operatively connected to a motor shaft 34 through meshing bevel gears 35—36 fixed on said shafts.

I also provide means for lifting the harrow sections out of contact with the ground or for adjusting the working depth of the teeth 33, the mechanism for accomplishing such adjustment comprising the segmental arms 37, having the shaft 7 as their radial center, which are attached at the lower ends adjacent the free ends of the hanger arms 9—9' and extend upwardly and are slidably confined in guide bearings 38 mounted on the end rails of the supporting frame 1.

The outer faces of the arms 37 are provided with rack surfaces 39 and meshing therewith are pinions 40, which are fixed on a cross-shaft 40' that extends parallel with the shaft 7 and is journaled in suitable bearings at opposite ends of the sub-frame.

Fixed on the shaft 7 is a sprocket wheel 41 which is connected by a chain belt 42 with a sprocket wheel 43 fixed on a sleeve 44 that is rotatable on the shaft 40', the sleeve 44 having a clutch face 45 adapted for coöperation with a clutch 46; the latter being slidably keyed on the shaft 40' and is operable by a shift yoke 47 and a foot lever 48 toward and away from the sleeve 44, so that when the clutch parts are in mesh the shaft 40' will be rotated and through the gears 40 and arms 9 the harrow sections will be raised from operative engagement with the ground surfaces. Normally the clutch parts are held disengaged by means of a spring 49 that is attached to the upper end of the lever 48 and to the frame rail 3.

To lock the harrow at a vertically adjusted position, I provide a clutch device 50 comprising a band 51 that is attached at one end to the frame rail 3 and incloses a drum 52 on the shaft 40'. The band 51 may be tightened against the drum to prevent rotation of the latter by means of a lever 53 mounted on a bracket 55 fastened to the frame rail 4 and having a spring and lever controlled tooth thereon for taking into a rack sector 55' to hold the band tightened about the drum to retain the harrowing element at the adjusted position.

With the device constructed as described, it will be seen that the harrow frame may be applied to a tractor frame and the implement driven through a field of young grain, to cultivate the same, and that a much greater area can be worked in one trip of the implement than with the ordinary devices, as the implement can work not only the row through which it is traveling but adjacent rows as well, and that by separating the harrow sections the shaft 12 may pass over the tops of the grain without damaging the same.

It is further seen that with the frame attached to a carrying device, such as a tractor frame, when it is not desired to use the implement it may be raised, by operation of the clutch mechanism, out of contact with the ground and locked in an elevated position until needed.

While certain specific uses of the implement have been referred to, I do not wish to limit myself thereto as its adaptability to other uses is apparent.

Having thus described my invention, what I claim as new therein, and desire to secure by Letters-Patent, is:

1. In combination with spaced supporting devices, a shaft carried by said devices, a series of ground working implements revolubly mounted on said shaft and comprising interlocking tool carrying members fixed on the separate implements in a continuous and spiral relation relative to the said shaft.

2. In combination with spaced shaft supporting devices, a shaft mounted in said devices, a series of ground working implements rotatably mounted on said shaft and comprising end wheels, means for keying said implements together to effect synchronous operation thereof and tubular tool carrying members fixed about the peripheries of said wheels in continuous spiral relation, and ground working tools fixed in said tubular members.

3. In combination with spaced supporting devices, a shaft carried by said devices, a series of ground working implements, each having a hollow axle rotatably mounted on said shaft and wheels fixed on the ends of the axle, tubular tool carrying members fixed to the wheels of each implement, and plugs in the ends of corresponding devices on adjacent implements to key the implements together and effect synchronous operation thereof.

4. In combination with spaced shaft carrying members, a shaft carried by said members, a plurality of ground working implements, each having a hollow axle rotatably mounted on said shaft, wheels fixed to the ends of each axle having spirally arranged, peripheral grooves adapted for registration with corresponding grooves in other implement wheels to receive and seat a spiral tool carrying device, a tool carrying device seated in the wheel grooves of each implement, and means connecting the tool carrying devices of adjacent implements to key the implements together and effect synchronous operation thereof.

5. In combination with spaced shaft carrying members, a shaft carried by said members, a plurality of ground working implements, each having a hollow axle rotatably mounted on said shaft, wheels fixed to the ends of each axle having spirally arranged, peripheral grooves adapted for registration with corresponding grooves in other implement wheels to receive and seat a spiral tool carrying device, a tool carrying device seated in wheel grooves of each implement, means connecting the tool carrying devices of adjacent implements to key the implements together and effect synchronous operation thereof, and a sprocket wheel on the outer wheel of the implement at each end of the shaft, for the purpose set forth.

6. In combination with spaced shaft carrying members, a shaft carried by said members, a plurality of ground working implements, each having a hollow axle rotatably mounted on said shaft, wheels fixed to the ends of each axle having spirally arranged, peripheral grooves adapted for registration with corresponding grooves in other implement wheels to receive and seat a hollow, spiral tool carrying device, a tool carrying device seated in the wheel grooves of each implement, plugs located in and connecting the tool carrying devices of adjacent implements to key the implements together and effect synchronous operation thereof, and a sprocket wheel on the outer wheel of the implement at each end of the shaft, for the purpose set forth.

In testimony whereof I affix my signature.

ANDREW H. REED.

Copies of this patent may be obtained for five cents each, by addressing the "Commissioner of Patents, Washington, D. C."